3,759,742
TEXTILE FLOOR COVERING
Manfred Salamon, Dormagen, Hans-Jurgen Hagebaum, Nievenheim, Martin Wandel, Dormagen, Cornelius Muhlhausen, Leverkusen, Werner Bau, Opladen, and Gerd-Konrad Reinecke, Leverkusen, Germany, assignors to Bayer Aktiengesellschaft, Leverkusen, Germany
No Drawing. Filed Oct. 9, 1970, Ser. No. 79,712
Claims priority, application Germany, Oct. 17, 1969, P 19 52 397.8
Int. Cl. B44d 1/09; D04h 1/48, 1/58
U.S. Cl. 117—161 KP
6 Claims

ABSTRACT OF THE DISCLOSURE

Textile floor cover coated with an unfoamed polyurethane elastomer based on a polyhydroxyl compound selected from the group consisting of polyesters of ethylene glycol, propylene glycol, butylene glycol and mixtures thereof, said glycols having two or more terminal hydroxy groups and an average molecular weight of 300–5000 and a polyisocyanate with an OH/NCO ratio of from 1:0.3 to 1:1.3.

---

This invention relates to a textile floor covering with a plastics underlay which has a permanently elastic, specifically adhesive backing based on cold-crosslinking polyurethane elastomers.

Tiles usually cut out into geometric shapes which can be laid without any difficulty, are being used to an ever-increasing extent as textile floor coverings, especially in private dwellings. Whereas in the past tiles were made from the residues accumulating during production, it is becoming increasingly more commonplace to develop articles adapted to the special requirements which should be satisfied carpet tiles. One of the requirements which must be satisfied by products of this kind is that they should remain dimensionally stable under different conditions (such as temperature and moisture). In addition, tiles which can be laid in the absence of an adhesive are required to rest firmly on any support under their own weight and flexibility. One particularly important factor is the elimination of any tendency on the part of the tiles to be dislocated through warping. Floor tiles having a heavy backing of filled polyvinyl chloride, natural or synthetic latices, or bitumen are known, as are tiles coated with an olefinic composition to enable them to remain firmly in position not only under their own weight, but also under the effect of limited adhesion to the floor.

All the aforementioned coatings are either hard, brittle, or plastic so that they do not in any way increase the tread elasticity required. These coatings can only be applied by means of cumbersome coating apparatus which occupies a considerable amount of space and consumes large amounts of energy. Some types of fibre (for example polyvinyl chloride fibres, polyacrylonitrile fibres, and polypropylene fibres) cannot be coated in this way because of the high temperatures required.

The present invention relates to a textile floor covering comprising a textile surface layer and a plastics underlay, wherein the plastics underlay is a polyurethane elastomer based on a polyhydroxyl compound and a polyisocyanate with an OH/NCO ratio of from 1:0.6 to 1:1.3. Textile floor coverings of this kind can be produced by a process which comprises mixing the polyurethane-forming reaction components, directly applying the resulting liquid mixture to the textile surface layer, or applying the mixture to a supporting web and subsequently inserting the textile layer, followed by storage in the absence of tension.

The polyurethane underlay can be universally used for all types of textile floor covering comprising any natural and/or synthetic fibres, and for any applications, for example in private dwellings, in indoor sports arenas and in sports stadia. The coating composition is inexpensive and easy to process and, in its fully reacted form, is flexible, permanently elastic and dimensionally stable over wide temperature ranges. In addition, the composition of the polyurethane can be adjusted in such a way that, when it is fully reacted, a permanently tacky elastic layer is formed which exhibits adhesive properties. The composition is a polyurethane elastomer which hardens at room temperature and to which fillers can be added in order to obtain a higher specific gravity.

The coating composition is applied in liquid form through metering pumps and a mixing head either directly to the textile floor covering itself or to a supporting web, in which case the textile floor covering is subsequently introduced. The reaction, which takes place in the absence of externally supplied energy, allows the use of extremely simple machine units, for example endless conveyor belts, which guarantee a complete reaction in the absence of tension.

Another form of apparatus which may be used comprises two synchronously driven rollers arranged with a gap between them, either one above the other or adjacent one another.

One roller is protected against any accumulation of reaction mixture by the substrate which is being coated, whilst the other roller is protected by a co-rotating covering of a suitable material having a separating effect with respect to the fully reacted reaction mixture. The layer thickness of the polyurethane is automatically determined by the interval between the two rollers. Naturally, any differences in the thickness of the substrate are compensated in this method of coating.

After the polyurethane has reacted, the coverings found to be suitable can be detached and re-used. Suitable coverings include, for example, films of polyolefins and barrier papers which have been coated with silicones or otherwise made repellant. It is also possible to use fabrics impregnated with polytetrafluoroethylene or silicone rubber, optionally in the form of endless covering strips. One requirement which must be satisfied by these covering materials is that they should show sufficient surface stability at temperatures of up to about 50° C., and should not adhere permanently to the polyurethane used.

Naturally, it is also possible by virtue of this process to carry out so-called reversal coating, i.e. the substrate is introduced into the reaction mixture lying on top of the covering. The advantage of this lies in the lower penetration of the coating material into the substrate. This is particularly necessary in the case of open or thin substrates.

Naturally, it is quite possible for the polyurethane to penetrate deeply into the substrate, especially when it is intended to obtain special consolidation effects. In this instance it is of advantage to apply the reaction mixture to the substrate and to apply the covering material as the uppermost layer. It is extremely easy to incorporate special net-like reinforcing materials by passing these materials, together with the polyurethane used or with the substrate through the apparatus described above. Naturally, this is only possible with materials which, by virtue of their open structure, allow the reaction mixture to flow through with little or no resistance.

The reaction time can be varied within wide limits, depending upon the particular requirements. The hardness of the coating can be adapted to meet particular requirements by varying the ratio of the individual components. It is possible by virtue of the process according to the invention to coat such textile products as, for example, needle felts, tuftings, tile fabrics, knitted fabrics and raschel webbing, depending upon particular requirements, to form textile floor coverings. The backing according to the invention also enables floor tiles to be produced from tufted carpeting without any need for previous knop solidification because the coating shows outstanding adhesion even to synthetic fibres.

In the production of needle felts for floor coverings, a special heavy-duty layer which also gives the finished floor covering its required appearance, is usually stitched on to an underweb. This underweb usually contains one or more stabilising fabrics. The underweb (or cushion layer) is intended to impart to the floor covering the tread elasticity required for textile coverings, and to improve dimensional stability. Stitched felt products of the kind used in floor coverings have to be additionally hardened, usually by means of dispersed or dissolved plastics in order to obtain high performance properties. This involves a considerable outlay in terms of apparatus, energy and time for the operations required. When the polyurethane coating according to the invention is used, the tread layer or heavy-duty layer is stitched into a stabilising fabric and coated without previous chemical consolidation. By virtue of the special properties of the polyurethanes used according to the invention it is of course possible to consolidate the reverse side when the backing is applied. In this process, the reaction mixture is adjusted in such a way that from about one quarter to three quarters of the reaction mixture penetrates into the stitched tread layer to be consolidated. The depth penetration is governed by the texture of the stitched felt (type and density of the fabric or film) and by the composition of the coating used. The stitched felt floor covering thus obtained has a soft binder-free textile tread layer.

In contrast to conventional stitched felts, consolidated by the so-called padding process, in which the individual fibres are merely bonded through bridge formation in the plastics dispersions used, the stitched fibres are intimately bonded throughout the entire coating range in the process according to the invention. The articles thus obtained are highly resistant to wear and tear, and show outstanding tread elasticity. This process eliminates the need for extensive consolidation operations with aqueous plastics dispersions and the subsequent drying of up to 2 kg. of water per sq. metre. When a stitched felt floor covering manufactured by the process described above is to be marketed in the form of tiles which can be laid in the absence of a separate adhesive, the coating composition is best applied in the form of a relatively thick layer in order to increase the weight of the tiles.

Examples of suitable polyhydroxyl compounds for producing the polyurethane elastomers include polyethers of ethylene glycol, propylene glycol or butylene glycol with two or more terminal OH groups (and an average molecular weight of from 300 to 5000) or mixtures thereof, reacted with polyisocyanates. Particularly good results have been obtained with olylene-2,4- and -2,6-diisocyanate and mixtures thereof in any ratio, the crude phosgenation product of the condensation product of aniline and formaldehyde, diphenyl methane-4,4'-diisocyanate and diphenyl methane diisocyanate modified with from 5 to 10% by weight of carbodiimide. In order to adapt the reaction between the polyhydroxyl compounds and the polyisocyanates to the manufacturing conditions, it is best to accelerate it through the addition of activators, for example dibutyl tin dilaurate, tin dioctoate or tertiary amines. Barium sulphate, kaolin and the like may be used as fillers. The OH:NCO ratio between the reacting components is in the range from 1:0.6 to 1:0.3. It should be from 1:1 to 1:1.3 (OH:NCO) for dry, non-tacky coatings. When a self-adhesive surface is required, a ratio of from 1:0.6 to 1:1 is used. In order to eliminate the influence of moisture, which results in bubble-formation, mineral drying agents may be added.

The following examples illustrate the invention more particularly.

EXAMPLE 1

A web obtained by the conventional process using cards and leasers, consisting of:

35% by weight of poly(ethylene glycol terephthalate) fibers dtex. 17, 80 mm. staple length
15% by weight of poly(ethylene glycol terephthalate) fibers dtex. 17, 100 mm. staple length, and
50% by weight of polyamide-6 fibres dtex. 135, 60 mm. staple length is pre-stitched on a needle loom to a penetration depth of 15 mm., turned, and then stitched to a depth of 15 mm. on to a polyester supporting fabric weighing 110 g. per square metre. This is followed by finish-stitching to a depth of 16 mm. Total number of stitches per square centimetre: 217.

In order to produce a heavy floor covering tile, 3.5 kg. of a non-tacky coating comprising component A and component B in a ratio by weight of 100 parts by weight of component A to 10 parts by weight of component B are applied to the reverse side of this stitched felt. Component A comprises 60% by weight of a branched polyether of propylene oxide and trimethylol propane with an OH number of 36,
37% by weight of a linear polypropylene oxide with an OH number of 28,
2.9% by weight of sodium aluminium silicate and
0.1% by weight of dibutyl tin dilaurate. Component B comprises crude diphenyl methane-4,4'-diisocyanate having an NCO content of 31%.

The two components are mixed in a mixing head and then applied. The ratio of OH to NCO is 1:1.29. The liquid coating mixture is uniformly distributed over the horizontally disposed felt web and up to 50% penetrates into the felt structure. After a reaction time of approximately 5 minutes, the coating is tack free and if desired can be cut into tiles or the like. Since this coating continues to react for a short time, the cut tiles are stored for 8 hours while lying flat. The layer thickness is 3 mm.

EXAMPLE 2

A web produced by the conventional process using cards and leasers, consisting of:

50% by weight of polyacrylonitrile fibres dtex. 17, 100 mm. staple length
35% by weight of polyamide-6 fibres dtex. 135, 60 mm. staple length
15% by weight of polyamide-6-fibres dtex. 90, 90 mm. staple length is pre-stitched to a depth of 15 mm. on a needle loom, turned and then stitched to a depth of 14 mm. on to a polyester supporting fabric weighing 110 g. per square metre. This is followed by finish-stitching to a depth of 12 mm. Total number of stitches per square cm.: 234.

A uniformly thick floor covering is applied to the reverse side of this felt web by means of a coating machine. The coating machine consists of two synchronously driven rollers arranged with a gap between them either above one another or adjacent one another, through which the felt web to be coated and the polyethylene film for introducing the coating composition is guided. The coating machine is laterally defined by polyethylene wedges adapted to the diameter of the rollers.

Alternatively to this direct coating process, the material can also be applied by the so-called reversal process using a suitable supporting web.

The coating composition delivered continuously from a casting machine, and comprises 100 parts by weight of a mixture of 60% by weight of a branched polyether of propylene oxide and trimethylol propane with an OH number of 36,
37% by weight of linear polypropylene oxide with an OH number of 28,
2.9% by weight of sodium aluminium silicate, and
0.1% by weight of dibutyl tin dilaurate to which 10 parts by weight of diphenyl methane-4,4'-diisocyanate has been added (ratio OH:NCO=1:1.29), is cast on to the web and distributed by the upper roller up to the lateral wedges. The plastics-coated floor covering thus obtained shows an absolutely uniform thickness of the kind required for a floor covering.

The layer thickness is 2.5 mm.

EXAMPLE 3

A web produced by the conventional process using cards and leasers, consisting of:

25% by weight of poly(ethylene glycol terephthalate) fibres dtex. 17, 80 mm. staple length,
25% by weight of polyacrylonitrile fibres dtex. 17, 100 mm. staple length
15% of polyamide-6 fibres dtex. 135, 600 mm. staple length is pre-stitched to a depth of 15 mm. on a needle loom, turned and then stitched to a depth of 15 mm. on to a polyester supporting fabric weighing 110 g. per square metre. This is followed by finish stitching to a depth of 12 mm. Total number of stitches per square cm: 217.

The coating composition delivered continuously from a casting machine, consisting of 100 parts by weight of a mixture of 60% by weight of a branched polyether of propylene oxide and trimethylol propane with an OH number of 26,
37% by weight of linear polypropylene oxide with an OH number of 28,
2.9% by weight of sodium aluminium silicate and
0.1% by weight of dibutyl tin dilaurate to which 6 parts by weight of diphenyl methane-4,4'-diisocyanate have been added, is cast on to the reverse side of this stitched felt web by means of the coating machine described in Example 2. The OH:NCO ratio is 1:0.78. The backing obtained on completion of the reaction is permanently tacky and elastic. For laying the protective covering is merely peeled off and the tiles laid on the dust-free floor. Layer thickness 3 mm.

The abrasion resistance and dimensional stability of the products of Example 1, 2 and 3 were measured by methods described by the Study Group on Needle-Felt Floor Coverings of the German Carpet Research Institute, Aachen. The results obtained are set out in the following tables:

TABLE 1.—ABRASION RESISTANCE: SCHOPPER

| Example | | 1 | 2 | 3 |
|---|---|---|---|---|
| Amount abraded (g./m.²) | Without polyurethane underlay. | 172.9 | 263.4 | 146.6 |
| | With polyurethane underlay. | 71.4 | 95.1 | 84.8 |

TABLE 2.—DIMENSION STABILITY

| | Example | | | | | |
|---|---|---|---|---|---|---|
| | 1 | | 2 | | 3 | |
| Polyurethane | With | Without | With | Without | With | Without |
| Percent: | | | | | | |
| 2 hr. at 60° C | −0.2 | −0.4 | −0.2 | −0.8 | −0.1 | −0.4 |
| 2 hr. in water | 0 | +0.1 | +0.1 | −0.5 | −0.1 | −0.3 |
| 24 hr. at 60° C | −0.3 | −0.8 | −0.4 | −2 | −0.2 | −0.8 |
| 48 hr. NK | −0.1 | −0.5 | −0.2 | −1.3 | − 1 | −0.4 |
| Mark | 5 | 4 | 5 | <4 | 5 | 4 |

The mark 5 means that the product has a dimensional stability high enough for freely-laid carpet tiles, whilst mark <4 means that the product is unsuitable for use as a floor covering.

EXAMPLE 4

A dense-pile textile web produced on a raschel knitting machine in which two guide bars work the backing (fringe and weft of Nm. 17/1 cotton) into which 400 g. per sq. metre of webbing produced separately from polyacrylonitrile fibres are worked, is used as heavy duty layer for a textile floor covering which can be used in the form of tailored pieces, preferably for carpeting bathrooms and toilets. For this purpose, a frame in the subsequent shape of the floor covering section is placed on the back of the heavy duty layer. The 5 mm. tall frame consists of polyethylene to prevent the coating composition from adhering. The polyurethane composition is poured into this frame up to its edges and left to react for 5 minutes. The polyurethane mass mixed homogeneously with a stirrer consists of 100 parts by weight of a mixture of 60% by weight of a branched polyether of propylene oxide and trimethylol propane with an OH number of 36,
37% by weight of linear polypropylene oxide with an OH number of 28,
2.9% by weight of sodium aluminium silicate and
0.1% by weight of tributyl tin dilaurate to which 10 parts by weight of diphenyl methane-4,4'-diisocyanate are added (OH:NCO ratio 1:1.29). After the frame has been removed, the floor covering section is cut out and stored for 8 hours on a flat surface to prevent the material from waving during the reaction of the polyurethane coating. Layer thickness 2.5 mm.

EXAMPLE 5

A warp pile fabric produced on a warp knitting machine is used as heavy duty layer for a highly wear-resistant floor covering. The polyamide-6 knitted pile webbing worked with two guide bars consists of polyamide-6 dtex. 44 with 9 filaments in the first guide bar and polyamide-6 d-tex. 100, again with 9 filaments, in the second guide bar. The polyurethane coating composition according to Example 2 is applied in the back of this warp pile fabric and at the same time a glass cloth is worked in. Layer thickness 3.5 mm.

The polyurethane coating composition used consists of 100 parts by weight of a mixture of 60% by weight of a branched polyether of propylene oxide and trimethylol propane with an OH number of 36,
37% by weight of linear polypropylene oxide with an OH number of 28,
2.9% by weight of sodium aluminium silicate and
0.1% by weight of dibutyl tin dilaurate to which 10 parts by weight of diphenyl methane-4,4'-diisocyanate have been added (OH:NCO ratio 1:1.29). After reaction time of 5 minutes, the coating can be cut. The floor covering is laid out flat to allow it to react fully.

EXAMPLE 6

A pile fabric produced on a tufting machine is coated with polyurethane elastomer after the usual finishing operations, and in the absence of knop consolidation. Floor covering tiles which can be laid in the absence of an adhesive are obtained for an application of 2 kg. per square metre to the back of the tufted heavy duty layer. The high adhesion of the coating composition to the fibrous material used eliminates the need for an additional knop consolidation. The coating composition is applied by the machine described in Example 2. The polyurethane coating composition used consists of 100 parts by weight of a mixture of 60% by weight of a branched polyether of propylene oxide and trimethylol propane with an OH number of 36,
37% by weight of linear polypropylene oxide with an OH number of 28,
2.9% by weight of sodium aluminium silicate and
0.1% by weight of dibutyl tin dilaurate to which 10 parts by weight of diphenyl methane 4,4'-diisocyanate have been added (OH:NCO ratio 1:1.29). The pile knops in the base fabric were found to have a bond strength of 13 kp.

What we claim is:

1. A textile floor covering comprising a textile surface layer selected from the group consisting of needle felts, tuftings, tile fabrics, knitted fabrics and raschel webbings coated with a plastics underlay, wherein the plastics underlay is an unfoamed polyurethane elastomer based on a polyhydroxyl compound selected from the group consisting of polyethers of ethylene glycol, propylene glycol, butylene glycol and mixtures thereof, said glycols having two or more terminal hydroxy groups and an average molecular weight of 300–5000 and a polyisocyanate with an OH/NCO ratio of from 1:0.3 to 1:1.3.

2. A textile floor covering as claimed in claim 1, wherein the textile surface layer comprises a stitched felt which has not been additionally consolidated.

3. The textile floor covering of claim 1 wherein said polyisocyanate is selected from the group consisting of tolylene-2,4-diisocyanate, tolylene-2,6-diisocyanate and mixtures thereof, the phosgenation product of the condensation of analine and formaldehyde, diphenyl methane-4,4'-diisocyanate and diphenyl methane diisocyanate modified with 5–10 percent by weight carbodiimide.

4. The textile floor covering of claim 1 wherein said OH/NCO ratio is 1:03 to 1:0.6.

5. The textile floor covering of claim 1 wherein said OH/NCO ratio is 1:1 to 1:1.3.

6. The textile floor covering of claim 1 wherein said OH/NCO ratio is 1:0.6 to 1:1.

References Cited
UNITED STATES PATENTS

| | | | |
|---|---|---|---|
| 3,385,751 | 5/1968 | Willard et al. | 161—159 |
| 3,582,423 | 6/1971 | Wang | 161—190 |
| 3,576,706 | 4/1971 | Baumann et al. | 161—160 |
| 3,664,863 | 5/1972 | Dijkhuizen et al. | 161—67 |

WILLIAM J. VAN BALEN, Primary Examiner

U.S. Cl. X.R.

161—67, 89, 92, 190